Aug. 6, 1957  H. R. C. ANTHONY ET AL  2,802,042
DRY CELL

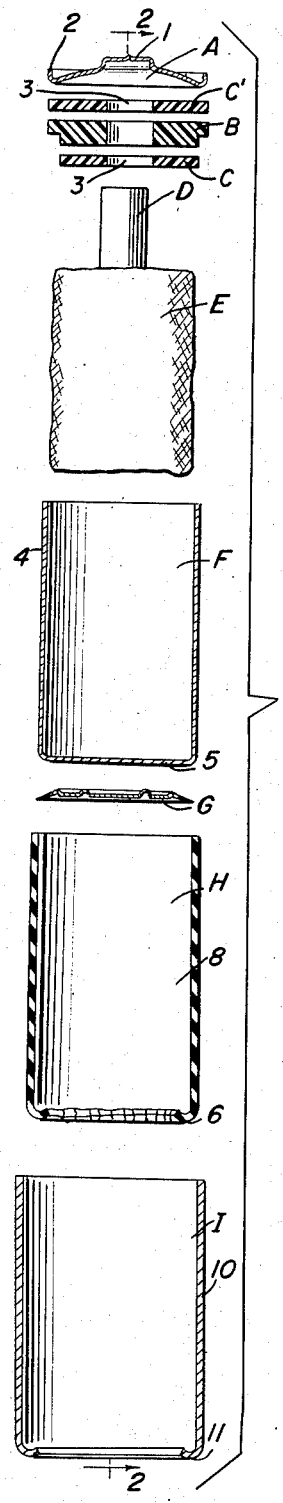

Filed May 6, 1954  2 Sheets-Sheet 2

INVENTORS
ARNOLD T. TORGERSON
HERMAN R. C. ANTHONY

BY Beale and Jones

ATTORNEYS

United States Patent Office 2,802,042
Patented Aug. 6, 1957

2,802,042
DRY CELL

Herman R. C. Anthony and Arnold T. Torgerson, Madison, Wis., assignors to Ray-O-Vac Company, Madison, Wis., a corporation of Wisconsin Application May 6, 1954, Serial No. 428,018

7 Claims. (Cl. 136—133)

This invention relates to dry cells, and more particularly to metal jacketed primary dry cells such as disclosed in prior Patents 2,198,423 and 2,243,938. Such dry cells find extensive use as primary cells for use in flashlights and the like.

As recognized in the said prior patents, the art had long been confronted with making provision for confining the corrosive electrolyte fluid within the cell before, during and after discharge of the cell. Unconfined electrolyte escaping to the exterior of the cell may short out adjacent cells rendering them useless and may also cause extensive corrosion damage. This problem of confinement is aggravated by the very nature of conventional cylindrical cell construction and by human factors.

Most conventional dry cells, as of the Leclanché type, employ a zinc or reactive metal cup. This cup must function in a dual capacity, first as a container for the associated solid and fluid cell components, while, second, at the same time furnishing, by dissolution and electrolytic reaction, metal which participates in the cell reaction. Clearly the more the cell is used, the more the zinc is consumed. Thus the walls of the zinc cup become progressively thinner, weaker and less reliable as a container for fluids.

The human factors enter into the problem both during the manufacture of such cells and during their use after manufacture. Where steps of fabrication and assembly are performed manually there is always considerable variation in the consistency and quality of the product and even where the cells are largely produced and assembled by machine there is nevertheless the problem of human failings in machine adjustments and in holding the work to prescribed tolerances. These circumstances can and do produce cells which are less perfectly assembled than on the average and which do not achieve the desired standards of quality. Certain of these assembly problems will be illustrated hereinafter.

When the manufactured cell enters commercial channels and is put to use by the consumer, the human factor is a major problem. Frequently cells are left on closed circuit for prolonged periods and subjected to unintended heavy drains—this may be the result of accidentally, or deliberately, leaving the flashlight with its switch on. Some of the results of such consumer abuse of the cells are swelling and distortion of the cells with physical damage to the flashlight casing and electrolyte leakage with chemical damage to the cells, to the flashlight casing and to other contacting objects.

In addition to the problems created by such misuse there is a further problem due to the ever increasing demand for higher capacities and greater output from primary batteries. To meet these demands it is often necessary to use more active materials in the cell components. This condition of more active materials and heavier drains greatly increase the tendency of cells to leak and makes even more difficult the problem of confining the products of the cell reaction.

In prior Patents 2,198,423 and 2,243,938 there is disclosed a construction which is very satisfactory in safeguarding the consumer against electrolyte seepage and cell distortion whether the cells are abused or used as intended. In this construction a strong metal sheath is provided which rigidly and closely confines the cell to a given length and diameter. The metal sheath is insulated from both terminals of the cell by a sleeve of insulating material which provides additional protection against leakage of the cell.

The present invention has for an important object the provision of cells which are further safeguarded by an improved cell closure wherein a metal end closure element is embedded in and buttressed against an insulating member at either or both ends of the cell. The insulating member may be a paper insulating sleeve or an electrolyte barrier element as hereinafter described. A further object is to provide a cell end-closure which serves as a terminal of the cell and which is adapted to form a liquid-tight joint with the adjacent surface of the insulating member on the smooth wall surface thereof as well as on the wrinkled surfaces of any turned-in lip thereof. A further object is to permit the machine fabrication and assembly of the several elements of the cell while eliminating to the maximum extent any unsealed voids or passageways which might permit electrolyte seepage from within the cell.

The accomplishment of these and other objects of this invention will become apparent from the following description as illustrated by the accompanying drawings wherein like reference numerals refer to the same or similar elements and wherein:

Figure 1 is an exploded view of various parts which comprise the cell assembly;

Figure 2 is a side elevation, in cross section, taken along line 2—2 of Figure 1, of an assembled cell;

Figure 3 is a side elevation, in cross section, of a preferred modification of top closure unit;

Figure 4 is a side elevation, in cross section, of a preferred modification of bottom closure unit, G;

Figure 5 is a side elevation, similar to Figure 4, of another modification of bottom closure unit, G';

Figure 6:
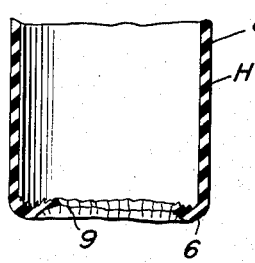
Figure 6 is a fragmentary side elevation, in cross section, taken along the line 6—6 of Figure 7 of the end portion of an insulating sleeve.

Referring to Figures 1 and 2 and to the cell elements illustrated therein, A designates a top closure and terminal member; B designates an insulating unit or mass; C designates an internal insulating washer member; D designates a first electrode member; E designates a depolarizing unit; F designates a second electrode member; G designates a bottom closure member and terminal; H designates an electrolyte barrier member or insulating sleeve—hereinafter generically referred to as insulating sleeve; I designates an outer metallic sheath member.

In assembling the completed cell embodying the present invention, as illustrated in Figure 2, the metal sheath I encloses the electrolyte barrier, or insulating sleeve, H and forces the end portions of the sleeve against the peripheral edges of both closure members A and G. The peripheral edges of both closure members are buttressed against and embedded in the insulating sleeve to form a seal against electrolyte leakage at both ends of the cell. This sealing action of the closure members together with the composition of sleeve H has been found extremely effective in confining the products of the cell reaction within the cell even under conditions of abuse and misuse.

As described in prior Patent 2,243,938, the cap terminal A desirably has a socket 1 which is adapted to accommodate and fit snugly over the upper end of electrode, or carbon pole D. The peripheral portion may desirably be flanged upwardly to form a rim 7 having an edge 2 adapted to be embedded in and buttressed against the insulating sleeve member H by the metal sheath I in the final step of assembly. Insulating washer C is provided with a central aperture 3 adapted to accommodate electrode D.

Cup electrode F has preferably a uniform, cylindrical side wall 4 and an integral bottom 5 which may, if desired, be somewhat greater in thickness than the thickness of the cup side wall 4 and which, if desired, may, in prefabrication be shaped to provide stiffening ribs or other embossed surfaces, not shown. In fabricating the cell, within cup electrode F there may be provided the conventional cylindrical paper liner or cup, not shown in the accompanying drawings, and a desired amount of a suitable depolarizer mix E. It will be understood that a suitable quantity of the desired electrolyte solution is added during fabrication of the cell.

Figure 7:
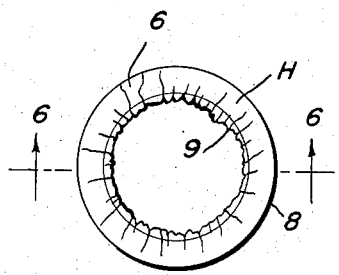
Figure 7 is a bottom plan view of an insulating sleeve as shown in Figure 6.

The insulating sleeve H should form a substantially electrolyte-impervious barrier. It may desirably be formed of 3-ply stock formed of polyethylene, or other suitable plastic, film backed on each side by machine polished kraft paper. It may also be formed, if desired, of suitably impregnated paper or box board. The sleeve should be so constituted as to possess a substantial amount of non-resilient rigidity yet be moderately deformable under the influence of pressure, or heat and pressure. Since it possesses these characteristics and does not flow, the operation by which the inturned lips 6 and 21 are formed may cause the material to wrinkle, fold and overlap with appreciable irregularity as shown in Figures 6 and 7 hereof. These wrinkles and fold lines are increasingly apparent on both faces of the lips 6 and 21 between the planes, as illustrated through line 7—7 of Figure 6, where deformation of the cylindrical side wall 8 commences, and the marginal lip extremities 9 and 23 of the sleeve bottom and top. It should be understood that sleeve H is both long enough to embrace cup electrode F with its associated parts and long enough to extend beyond the inwardly crimped end edges of the sheath I at both ends of the fully assembled cell.

Insulating sleeve H serves to insulate metal sheath I from both cell terminals and thus prevents the cell from short circuiting on the side walls of the casing. In addition, the sleeve forms a barrier which is impervious to electrolyte and greatly reduces the possibility of leakage.

The top closure member or cap A is an important element of the present invention. It may desirably have its upper surface decorated by any suitable coloring or legends. Preferably the cap is formed of ferrous material to impart strength but certain brass alloys may be employed. Where ferrous material is used, at least the underside of the cap may be tin plated or coated with like corrosion-resistant metals. On or more overcoats of relatively conductive, corrosion-resistance paints or lacquers may be added, if desirable, to protect surfaces of the cap which might be exposed to electrolyte. In shaping the closure member A, it has been found desirable to provide an elevated socket 1 to accommodate the upper end of electrode D. From the outer margin of socket 1 member A is provided with an outwardly and downwardly flaring skirt portion which terminates in an upwardly extending flange or lip 7. As shown in Figure 3, lip 7 is bent upwardly, away from the flaring skirt to a degree measured by the angle M. Desirably the angle M is 90° plus or minus about 10° from the horizontal.

The bottom closure member and terminal G is another important element of the present invention. Desirably, it is formed of metal, preferably ferrous, to impart strength, although certain brass alloys and other alloys which are relatively electro-chemically inert, with respect to the cup electrode, may be employed. Where ferrous material is employed, it has been found desirable to enhance the corrosion-resistance of the base metal with tin-plate or a coating of like corrosion-resistant metal. Here, too, the use of one or more overcoats of relatively conductive, corrosion-resistant paints or lacquers may be desirable. In shaping the closure member G, it has been found desirable to form an annular stiffening rib 12 which has a diameter approximately the diameter of the pole electrode D. This rib 12 provides a raised bearing surface which supports the overlying portion of the bottom 5 of the cup electrode F, thus providing electrically conductive contact with said electrode F while supporting said electrode bottom 5 out of physical contact with the horizontal surfaces 13 of member G. An added advantage of the elevated rib 12 is that is stiffens the member G against distortion caused by either unduly heavy crimping pressures during cell assembly or heavy internal cell pressures caused by shorting or prolonged drains. Where such pressures become unduly heavy, rib 12 may flatten out and augment the adjacent metal in the relatively depressed horizontal surfaces 13 by metallic flow.

The closures of the present invention are each shaped so as to provide a peripheral edge which is adapted to be embedded in and buttressed against insulating sleeve H. The closure member is embraced at its marginal edge portion by the curled-over insulating sleeve. The metal sheath I reinforces and surrounds the insulating sleeve and forces the sleeve against the peripheral edge of the closure member. This cooperation between the members, wherein the curled-over metal sheath forces the insulating sleeve against a peripheral edge of the closure member and embeds the edge of the closure member in the sleeve, has been found to provide a cell closure which is extremely effective in confining the products of the cell reaction. It will be understood that this cooperation of metal sheath, insulating sleeve and closure member embedded therein may be achieved with variously shaped closure members.

Thus in the top closure member A, illustrated in Figures 2 and 3 of the drawings, the skirt terminates in an upturned peripheral lip 7 the extreme end edge 2 of which may in some instances be, but need not be, sharpened and which is adapted to bite into insulating sleeve H. Similar provision is made in the bottom closure members.

Figure 9:
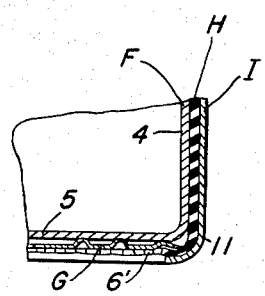
Figure 9 is an enlarged fragmentary view, in cross section, of an assembled cell provided with the bottom closure unit of Figure 4.

For example in the modification of member G illustrated in Figures 4 and 9 of the drawings, a second annular rib 14 is formed adjacent the periphery of G. The outer face of rib 14 is extended into an angularly disposed, downwardly directed flange or rim 15. Rim 15 terminates in a peripheral edge 16 which may in some instances be, but need not be, sharpened, and which is adapted to bite into insulating sleeve H.

Figure 10:
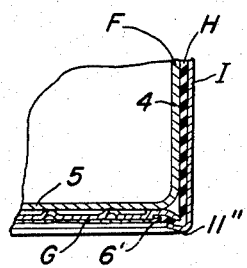
Figure 10 is an enlarged fragmentary view, in cross section, of an assembled cell provided with the bottom closure unit of Figure 5.

The modification G' shown in Figures 5 and 10 should preferably be similarly proportioned. This form differs from that of Figure 4 in having a more pronounced and rectilinear rib member the upper surface 18 of which is relatively flattened and supported at its inner edge by a vertical flange 19. This modification of G provides a more pronounced under recess 17 and a somewhat shorter rim 15 than that of Figure 4.

Figure 8:
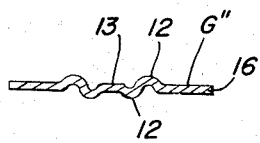
Figure 8 is a side elevation, in cross section, of another modification of bottom closure unit, G''.
Figure 11:
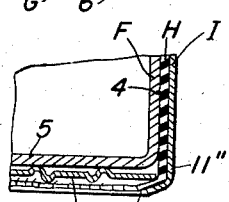
Figure 11 is an enlarged fragmentary view, in cross section, of an assembled cell provided with the bottom closure unit of Figure 8.

The modification G'' shown in Figures 8 and 11 should preferably be similarly proportioned. This form differs from that of all other modifications in that its major portion 13 is a substantially flat disc wherein the peripheral edge 16 is directed outwardly within substantially the same plane as that of the portion 13. It is adapted to bite into the lateral wall surface 8 of the insulating sleeve H when the crimped end 11 of the metal sheath is bent in at an obtuse angle as shown in Figure 11.

A mode of assembly of the complete cell will now be described by way of illustration. A sub-assembly comprising electrode cup F, centrally disposed pole electrode D, and the depolarizer mix mass E, and a measured amount of electrolyte, is first prepared. Insulating washer C is then inserted over the pole electrode D and within cup electrode F where it comes to rest, substantially horizontally, within the cup F and above depolarizer mass E. If the electrolyte was not added with the depolarizer mix before the latter was leveled and consolidated by tamping, it may be added in measured amount just prior to the insertion of insulating washer C.

A second sub-assembly may be formed by placing or dropping bottom closure member G into the insulating sleeve H. These two elements may then be inserted into the metal sheath or jacket I. A preformed insulating mass possessing some plasticity may then be placed on top of insulating washer C; but preferably molten dielectric plastic, such as an asphaltic composition, B is poured on top of insulating washer C to a level above the top rim of cup electrode F and permitted to solidify, as by cooling, in a shape which conforms to all surfaces within the sub-assembly adjacent the top of the cup electrode. When plastic composition B shall have been placed, or solidified in place, it may, if desired, be surmounted by an additional insulating washer C' similar to C. The preformed cap terminal member A is then centered over pole electrode D and permitted to rest on the plastic composition B or its surmounting insulating washer.

The thus nearly completed cell is then ready for the final crimping and closing operation. The said cell is placed in a press adapted to support the bottom lip 11 of the metallic sheath I while crimping the top lips 21 and 22 of the insulating sleeve H and metal sheath I over the peripheral edge 2 of cap A. It should be noted that lip 22 of sheath I and correspondingly lip 21 of insulating sleeve H are preferably crimped into a tighter inverted-U than shown in Figure 2 in which these elements have been illustrated in somewhat slack assembly for clarity of portrayal. It is desirable to maintain pressure on the top and bottom lips of the metal sheath during this crimping operation so the upper and lower inturned lips 6 and 21 of the insulating sleeve H are compressed between edge 2 of top closure A and lip 22 of sheath I and lip 11 of sheath I and the adjacent edge 16 of bottom closure G, respectively.

This compression should be sufficient to embed the peripheral edges of the closure members in the insulating sleeve but should not be great enough to cause the edges of the closure members to cut through the sleeve and short circuit the cell. Preferably sleeve H should be moderately deformable but should be somewhat hard surfaced so as to possess substantial resistance to penetration under the applied pressure.

The wrinkles and fold lines formed in inturned lips 6 and 21 of sleeve H offer paths by which electrolyte forced through perforations in the cup electrode might escape to the exterior of the cell. The closures of the present invention are effective in preventing such leakage by virtue of the penetration of the edge of each closure into the smooth inner surface of the insulating sleeve at such a point as is adjacent the area where the deformation of the side wall commences and where the wrinkles are at a minimum. If the closures should be placed during the cell assembly so that the edges thereof contact the wrinkled portion of lips 6 or 21, the embedding of the closure edge in the insulating sleeve during the closing operation tends to flatten and compress the wrinkles and folds along the line of embedding. This seals off the paths to the exterior of the cell and prevents electrolyte leakage.

The conformation of the marginal portions of the present closures, with particular emphasis on the annular rib 14, or 18, and rim 7, permits the closure members to function as backing dies against which the lips of sheath I may be forced to impart additional crimping of said lips in the final crimp sealing of the cell. In other words, the cell may be end-crimped and sealed under greater pressure than prior art construction permitted. Thus, not only is it possible to produce more tightly sealed cells, but there is less danger of production of insufficiently sealed calls or cells which are deformed or damaged in assembly, than in prior construction.

In fabricating bottom closure elements in accordance with this invention the marginal portions of the closures may be in the horizontal plane, or below the horizontal at right angles to the horizontal or in the form of acute or obtuse angles. The marginal edge of the closure should be situated so the crimping of the metal sheath I forces the edge of the closure element against insulating sleeve H and embeds the closure edge therein around the closure periphery. As one example of the formation of the closure element of the invention, as illustrated in Figures 4 and 5, the angle of inclination of rim 15 below a horizontal plane may vary within the range of about 5° to about 75°, it being understood that with stock formed of heavier gauge metal, or of material which possesses superior strength and rigidity, the selection of any angular inclination within this range is a matter of choice. With thinner gauge, or weaker materials, a range of between about 15° to about 30° below a horizontal plane is preferred. In an illustrative example with tin plate of .010 inch gauge thickness, an inclination of rim 15 of about 18° below the horizontal has been found extremely satisfactory. In another example of bottom closure element, as illustrated in Figure 8, there is no angle of inclination of the edge 16 with respect to the surface 13. However, as illustrated in Figure 11, the lower lip 11" of sheath I is crimped inwardly at an angle, preferably obtuse, so that the angular relationship between edge 16 and lip 11" is similar to that of the modification of Figures 4 and 5. In general the angular deviation of rim 11", with respect to the plane surface 13 of G" may vary within the approximate range of about 5° to about 75°.

In fabricating top closure elements in accordance with this invention, the marginal portions of the closures may be above the horizontal at right angles to the horizontal, or in the form of obtuse or acute angles and even in the horizontal plane. As explained above with respect to bottom closure elements, the marginal edge 2 of the top closure should be so situated that the crimping of metal sheath I forces the edge 2 of the closure element against insulating sleeve H and embeds the closure edge therein around the closure periphery. While the angular inclination of rim 7, from or above the horizontal, is somewhat a matter of choice, an obtuse angle within the range M is preferred, although the rim construction of each of the bottom closure modifications may be utilized, by inversion, if desired.

It will be understood that the advantages of this invention may be achieved by utilizing the closure elements at either the top or the bottom end of the cell, or at both ends.

The present invention has been illustrated by a form of construction, of a widely used primary dry cell of the Leclanché type wherein a carbonaceous or graphitic pencil or pole constitutes one cell electrode and a zinc cup constitutes the other electrode of opposite polarity. It should be understood that the advantages of the present invention are not restricted to cells of such construction, or even of the Leclanché system. Thus, the cup electrode F of the present invention may be of metal other than zinc or may, if desired, be carbonaceous or graphitic in composition. Electrode D need not be of carbon or graphite but may be of some material such as zinc or some other metal capable of electro-chemical reaction with the cup electrode. Electrode D may be formed in any desired shape. With such changes in the electrodes it will be understood that suitable depolarizing materials and electrolyte solutions may be employed in each instance as is understood in the art.

We claim:

1. An electrically reactive cell comprising a cylindrical cell body, an insulating sleeve encompassing the side wall of said body, conductive closure members covering the top and bottom of said cell body, said sleeve having its top and bottom ends turned inwardly around and over the outer margins of said closure members, and a metallic sheath encompassing said sleeve and crimped around and over part of said inturned ends, at least one of said closure members having a marginal edge which is directed outwardly and in the direction toward that end of the cell at which the closure member is positioned, and embedded in said sleeve adjacent an inturned end thereof.

2. A primary dry cell comprising a cup-shaped first electrode, electrolyte and depolarizer within said first electrode and a second electrode disposed in part within said first electrode, an insulating sleeve encompassing the side wall of said first electrode, extending beyond the upper and lower ends thereof, and having its end curled inwardly, at least one conductive closure member in contact with one of said electrodes, said closure member having a marginal edge which is directed outwardly and in the direction toward that end of the cell at which the closure member is positioned, and embedded in said sleeve, and a metallic sheath encompassing the side wall of said sleeve and crimped around and over the ends of said sleeve without covering the marginal extremities thereof.

3. An electrically reactive cell comprising a cylindrical cell body, a pre-shaped dielectric, electrolyte-barrier sleeve encompassing the side wall of said body, conductive closure members covering the top and bottom of said cell body, said sleeve having the top and bottom ends thereof turned inwardly around and over the outer margins of said closure members, and a metallic sheath encompassing said sleeve and crimped around and over part of said inturned ends, said closure members each having a marginal edge which is directed outwardly and in the direction toward that end of the cell at which the closure member is positioned, and embedded in said sleeve adjacent said inturned ends thereof.

4. A primary dry cell comprising a cup-shaped first electrode, electrolyte and depolarizer within said first electrode and a second electrode disposed in part within said first electrode, an insulating electrolyte-barrier sleeve encompassing the side wall of said first electrode, extending beyond the upper and lower edges thereof, and having its ends curled inwardly, a bottom closure in contact with said first electrode and having a downwardly inclined marginal lip which is directed outwardly and downwardly against and embedded in said sleeve, a metallic sheath encompassing the side wall of said sleeve and having at least its lower end crimped around and under the lower margin of said sleeve without covering the marginal extremity thereof.

5. In a primary dry cell comprising a cup-shaped first electrode, electrolyte and depolarizer within said first electrode and a second electrode of opposite polarity disposed at least partially within said first electrode, a preformed insulating sleeve encompassing the side wall of said first electrode and having inwardly directed lips at each end of said first electrode, and a metallic sheath encompassing said sleeve and having its marginal ends crimped inwardly and over all but the lip extremities of said sleeve, the improvement which comprises at least one end closure member in contact with an adjacent of said electrodes and forming a terminal of said cell, said closure member having a peripheral edge which is directed outwardly and in the direction toward that end of the cell at which the closure member is positioned, and embedded in said insulating sleeve.

6. In a primary dry cell comprising a cup-shaped first electrode, electrolyte and depolarizer within said first electrode and a second electrode disposed in part within said first electrode, an insulating sleeve encompassing the side wall of said first electrode and having inwardly directed lips at each marginal end of said first electrode, and a metallic sheath encompassing said sleeve and having its marginal ends turned in and crimped over all but the marginal lipe extremities of said sleeve, the improvement which comprises top and bottom closure members in contact with said electrodes and forming the terminals of said cell each of said closure members having an inclined marginal rim, the edge of which is directed outwardly and in the direction toward that end of the cell at which the closure member is positioned, and embedded in said insulating sleeve.

7. A primary dry cell having metallic terminal members at opposite ends, comprising a hollow metal electrode containing electrolyte, a carbon electrode and depolarizer-mix in said electrolyte, one of said metallic terminals comprising a metallic top closure member insulated from said metal electrode and in contact with said carbon electrode and having its marginal edge crimped under one end of a substantially electrolyte-impervious insulating sleeve, the other of said metallic terminals comprising a metallic bottom closure member in contact with said metal electrode and having its marginal edge crimped under the opposite end of said insulating sleeve, said insulating sleeve encompassing said metal electrode and the marginal edges of said metallic terminals, a metal sheath encompassing said insulating sleeve and having its ends crimped around all but the marginal extremities of said crimped ends of said insulating sleeve, each of said closure members having an inclined marginal rim and having its marginal edge directed outwardly and in the direction toward that end of the cell at which the closure member is positioned, and embedded in said insulating sleeve.

References Cited in the file of this patent

UNITED STATES PATENTS

| | | |
|---|---|---|
| Re. 23,427 | Ruben | Oct. 30, 1951 |
| 2,103,714 | Drummond | Dec. 28, 1937 |
| 2,198,423 | Anthony | Apr. 23, 1940 |
| 2,243,938 | Anthony | June 3, 1941 |
| 2,289,249 | Deibel | July 7, 1942 |
| 2,307,763 | Deibel | Jan. 12, 1943 |
| 2,427,561 | Keller | Sept. 16, 1947 |
| 2,445,005 | Schmelzer | July 13, 1948 |
| 2,461,534 | Ellis | Feb. 15, 1949 |
| 2,590,824 | Roehrl | Mar. 25, 1952 |
| 2,595,963 | Lewis et al. | May 6, 1952 |
| 2,636,062 | Colton | Apr. 21, 1953 |
| 2,665,329 | Brennan | Jan. 5, 1954 |